United States Patent Office 3,651,050
Patented Mar. 21, 1972

3,651,050
ACYLATION OF 6-AMINOPENICILLANIC ACID AND 7-AMINOCEPHALOSPORANIC ACID
Susumu Nakanishi, Niantic, Conn., assignor to Pfizer Inc., New York, N.Y.
No Drawing. Filed Jan. 23, 1969, Ser. No. 793,604
Int. Cl. C07d 99/24, 99/16
U.S. Cl. 260—239.1
14 Claims

ABSTRACT OF THE DISCLOSURE

The acylation of 6-aminopenicillanic acid and 7-aminocephalosporanic acid using carboxylic acids with hexachlorocyclotriphosphatriazine or hexabromocyclotriphosphatriazine as acylating agents is described.

BACKGROUND OF THE INVENTION

This invention relates to a novel process for the preparation of penicillins and cephalosporins. More particularly, it relates to the direct acylation of 6-aminopenicillanic acid and 7-aminocephalosporanic acid using the condensation products of carboxylic acids with hexahalocyclotriphosphatriazines The acylation of 6-aminopenicillanic acid by a broad variety of acylating agents is described in U.S. Pat. 3,159,-617. Among the acylating agents disclosed are organic acid halides and anhydrides, acid azides, lactones, activated esters, carboxylic acids with carbodiimides or alkoxyacetylenes and acylated enols. Likewise, the acylation of 7-aminocephalosporanic acid and closely related derivatives thereof by various acylating agents; e.g., acid halides, organic acids with carbodiimides, and silylation followed by reaction with an organic acid, is described in Belgian Patent 664,654; U.S. Pat. 3,252,973; and British Pat. 1,073,530; respectively.

The reactions of hexachlorocyclotriphosphatriazine with a variety of compounds such as amines, phenols, and alcohols to form substitution products are described in the literature [Shaw, Chem. Ind. 1737 (1967); Paddock, Quart. Rev., 18, 168(1964)]. More recently, the use of hexachlorocyclotriphosphatriazine as an activator of carboxylic acids to produce an intermediate capable of reacting with amines to form amides was reported by Caglioti et al., J. Org. Chem. 33, 2979–81 (1968). However, the reaction of amino acids and particularly of the chemically sensitive 6-aminopenicillanic acid and 7-aminocephalosporanic acid and its derivatives with hexachlorocyclotriphosphatriazine have not been reported.

SUMMARY OF THE INVENTION

It has now been found that penicillins and cephalosporins can be readily and economically prepared by acylating compound selected from the group consisting of 6-aminopenicillanic acid and

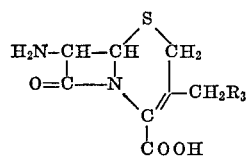

I and the alkali metal, alkaline earth metal, and amine salts thereof, wherein $R_3$ is selected from the group consisting of hydrogen, hydroxy, and acetoxy with a carboxylic acid in the presence of hexachlorocyclotriphosphatriazine or hexabromocyclotriphosphatriazine in a reaction-inert solvent at a temperature of from about $-10°$ C. to about $50°$ C. and at a pH of from about 5 to about 9.

The reaction is broadly applicable to carboxylic acids in general and can be used to prepare the various types of penicillins and cephalosporins described in the art. In the case of carboxylic acids having groups susceptible to reaction with the hexahalocyclotriphosphatriazine or the condensation product thereof with the carboxylic acid, e.g., hydroxy or amino groups, such groups are protected by acylation prior to reaction with the hexahalo triphosphatriazine.

Representative of such penicillins and cephalosporins are the following: benzyl-, phenoxymethyl-, α-phenoxy (lower alkyl)-, phenyl-, 2,6-dimethoxyphenyl-, allylmercaptomethyl-, 5-methyl-3-phenyl-4-isoxazolyl-, 2-ethoxy-1-naphthyl-, α-acetamidobenzyl-, 5-methyl-3-o-chlorophenyl-4-isoazolyl-, p-methoxybenzyl-, n-heptyl-, α-acetoxybenzyl-, β-(p-methoxyphenethyl)-, β-chloroethyl-, cinnamyl-, and 2-quinolinyl-penicillins; benzofurylmethyl-, p-chlorobenzyl-, styryl-, p-nitrobenzyl-, 2,6-dimethoxyphenyl-, benzyl-, 4-pyridylmethyl-, 2-thienylmercaptomethyl-, n-butylmercaptomethyl-, 2 - methyl - 5 - phenyl-1,3,4-dioxazolyl-, phenoxymethyl-, α-methoxybenzyl-, β-bromoethyl-, β-carbobenzoxyaminoethyl-, α-furyl-, α-thienyl-, 2-thienylmethyl-, cyclopentylmethyl-, adamantanylmethyl-, and β-(2-furyl)ethylcephalosporins.

The process of this invention is especially useful for the preparation of N-acyl derivatives of 6-aminopenicillanic acid and 7-aminocephalosporanic acid and its derivatives (Formula I) in which the acylating agent or the resulting N-acyl group is sensitive to degradation, e.g., the α-carboxy phenyl and α-carboxy aryl groups in general. The tendency for the α-carboxy aryl groups to undergo decarboxylation requires rather moderate reaction conditions during preparation, recovery, and purification. The present process, which is characterized by simplicity and mild reaction conditions, is ideally suited for the introduction of such groups into these amino acids to give the following products (Formulae II and III):

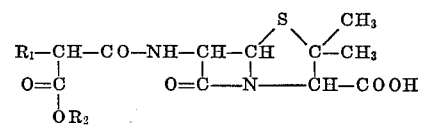

II and

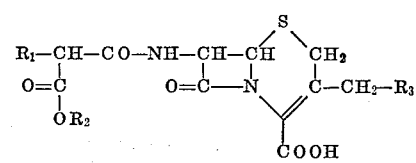

III and the pharmaceutically acceptable salts thereof wherein $R_1$ is selected from the group consisting of thienyl, furyl, pyridyl, phenyl, and substituted phenyl wherein the substituent is selected from the group consisting of (lower)alkyl, chloro, bromo, (lower)alkoxy, di(lower)alkylamino, and trifluoromethyl;

R₃ is selected from the group consisting of hydrogen, hydroxy, and acetoxy; and

R₂ is selected from the group consisting of phenyl and
substituted phenyl wherein the substituent is selected from the group consisting of at least one of chloro, bromo, fluoro, lower alkyl, lower alkoxy, lower alkanoyl, carbo(lower)alkoxy, nitro, and di(lower)alkyl amino;
furyl
quinolyl
methyl substituted quinolyl
phenazinyl
9,10-anthraquinonyl
phenanthrenequinonyl
anthracenyl
phenanthryl
(1,3-benzoiodoxolyl)
3-(2-methyl-4-pyronyl)
3-(4-pyronyl) and
N-(methylpyridyl);

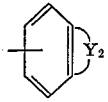

wherein Y₂ is selected from the group consisting of:

—CH=CH—O—     —CH=CH—CH=CH—
—CH=CH—S—     —C(O)—CH=CH—C(O)— and
—CH₂—CH₂—S—   —C(O)—C(O)—CH=CH—:
—CH=N—CH=CH— and

wherein Z' is lower alkylene and is selected from the group consisting of —(CH₂)₃— and —(CH₂)₄—, and substituted derivatives thereof wherein the substituent is selected from the group consisting of methyl, chloro, and bromo;

benzyl and
substituted benzyl wherein the substituent is selected from the group consisting of chloro, bromo, fluoro, lower alkyl, lower alkoxy, lower alkanoyl, carbo(lower)alkoxy, nitro, and di(lower)alkylamino;
phthalimidomethyl
benzohydryl
trityl
cholesteryl;
alkenyl having up to 8 carbon atoms;
alkynyl having up to 8 carbon atoms;
(1-indanyl)methyl
(2-indanyl)methyl
furylmethyl
pyridylmethyl
(2-pyrrolidono)methyl
(4-imidazolyl)methyl
[2,2-di(lower alkyl)-1,3-dioxolon-4-yl]methyl
cycloalkyl and (lower alkyl)substituted cycloalkyl having from 3 to 7 carbon atoms in the cycloalkyl moiety;
bicyclo [4.4.0] decyl
thujyl
fenchyl
isofenchyl
7-adamantanyl
ac-indanyl and substituted derivatives thereof wherein the substituent is selected from the group consisting of methyl, chloro and bromo;
ac-tetrahydronaphthyl and substituted derivatives thereof wherein the substituent is selected from the group consisting of methyl, chloro and bromo;
alkyl and substituted lower alkyl wherein the substituent is selected from the group consisting of at least one of:
chloro
bromo
fluoro
nitro
carbo(lower alkoxy)
lower alkanoyl
lower alkoxy and
cyano;
—CH₂—CH₂—NR₅R₆
—CH₂—CH₂—CH₂NR₅R₆
—CH₂—CH(CH₃)—NR₅R₆ and
—CH(CH₃)—CH₂—NR₅R₆ wherein —NR₅R₆ is selected from the group consisting of —NH(lower)alkanoyl,

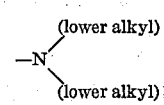

wherein the (lower alkyl) groups may be alike or different; and -N(lower alkyl)anilino;
and -(lower alkylene)-Y₁ wherein (lower alkylene) contains from 1 to 3 carbon atoms;
and Y₁ is selected from the group consisting of:

azetidino
aziridino
pyrrolidino
piperidino
morpholino
thiomorpholino
N-(lower alkyl)piperazino
pyrrolo
imidazolo
2-imidazolino
2,5-dimethylpyrrolidino
1,4,5,6-tetrahydropyrimidino
4-methylpiperidino and
2,6-dimethylpiperidino.

Of the lower alkyl, lower alkoxy, lower alkanoyl and carbo(lower)alkoxy groups those having from one to four carbon atoms in the alkyl, alkoxy and alkanoyl moieties are preferred since the reactants bearing such groups are more readily available than are those required for such groups having a greater number of carbon atoms.

Also included within the scope of this invention are the pharmaceutically acceptable salts of the novel compounds of Formulae II and III. Salts such as the sodium, potassium, calcium, magnesium, ammonium, and substituted ammonium salts, e.g., procaine, dibenzylamine, N,N'-dibenzylethylenediamine, N,N'-bis(dehydroabietyl) ethylenediamine, 1-ephenamine, N-benzyl - β - phenethylamine, trialkylamines, including triethylamine, as well as salts with other amines which have been used to form salts with benzylpenicillin are useful for the preparation of pharmaceutically elegant compositions of these valuable antibiotics.

The penicillins and cephalosporins are valuable antibacterial agents, capable of inhibiting the growth of numerous types of organisms in a variety of environments. The α-carboxyarylmethylpenicillin esters and the analogous cephalosporin compounds (Formulae II and III) are not only active antibacterial agents per se as is described in British 1,004,670 and 1,125,557; South African 67/6472; Belgian 711,649; and U.S. application Ser. No. 716,305, filed Mar. 27, 1968, but serve as intermediates for preparation of the corresponding acids by hydrolysis of the esters as described in these references and in Belgian Pat. 713,868.

DETAILED DESCRIPTION OF THE INVENTION

The degree of purity of the 6-aminopenicillanic acid and 7-aminocephalosporanic acid derivative is not critical to the success of the process. The amino acid can be used in the pure form, the partially pure form, or in the crude form such as that contained in a fermentation broth or a hydrolysis mixture. Indeed, when using an aqueous solvent system, such as water or water-organic solvent, fermentation broths containing the amino acid, 6-aminopenicillanic acid, are favored from an economic standpoint.

By reaction-inert solvent is meant a solvent which, under the conditions of the process, does not enter into any appreciable reaction with either the reactants or the products. Aqueous and non-aqueous solvents can be used. The use of water as solvent does, of course, result in some hydrolysis of the acid chloride reactant. However, under the proper conditions of temperature, pH, and time, the hydrolysis occurs at a relatively slow rate compared to the desired N-acrylation reaction. Suitable solvents for the process of this invention include methylene chloride, benzene, chloroform, dioxane, water, methyl isobutyl ketone, acetone, tetrahydrofuran, cyclohexane, lower alkyl acetates, diethyl ether, and dimethyl ether. Aqueous solvent systems, including those in which an emulsion is formed; e.g., water-water immiscible solvent, can also be used. Solvents which readily form emulsions with water include those water immiscible solvents such as benzene, methylene chloride, chloroform, methyl isobutyl ketone, and lower alkyl acetates (e.g., ethyl acetate). The favored water immiscible solvents are methyl isobutyl ketone and ethyl acetate and especially methylene chloride.

The reaction is generally, and desirably, conducted by mixing the chosen carboxylic acid or a salt thereof with the hexahalocyclotriphosphatriazine in a reaction-inert solvent. The use of a salt of the carboxylic acid is preferred since it permits neutralization of the by-product hydrogen halide, more complete and rapid formation of the intermediate reactant and better pH control. Suitable salts are the alkali metal, especially sodium and potassium salts, alkaline earth metal salts, e.g., calcium, barium, magnesium, and organic base salts. Primary, secondary, and tertary amine salts are operative in this process. However, the preferred organic bases are the tertiary amines and especially the tri(lower alkyl)amines, e.g., triethylamine. Other amine bases which can be used are dibenzylamine, N,N'-dibenzylethylenediamine, N-(lower alkyl)piperidines, N-(lower alkyl)morpholines, tri-n-butylamine. Such amine salts generally render those carboxylic acids which are insoluble or difficultly soluble in the solvent system, soluble and thus expedite the reaction. The salts can, of course, be preformed or formed in situ.

The molar ratio of carboxylic acid or carboxylic acid salt to hexahalocyclotriphosphatriazine is not critical but can vary from about 1:3 to about 1:1. The preferred molar ratio is from from about 1:2 to about 1:1.

The amino acid reactant is then added to the solution of activated carboxylic acid. In order to achieve partial solubility of the amino acid in the reaction-inert solvent and better control of pH, the amino acid is preferably used in the form of a salt with an organic base such as those mentioned above. The preferred organic bases are the tri(lower alkyl)amines and especially triethylamine. The molar ratio of amino acid (or salt) to carboxylic acid is not critical but can vary over a broad range, e.g., from about 1:1 to about 10:1. It is advantageous, however, indeed preferred, to use a molar ratio of from about 1:1 to about 3:1. Molar ratios greater than the preferred range offer no advantages; smaller ratos frequently result in reduced yields.

The process is carried out over the pH range of from about 5 to about 9 and preferably over the pH range of about 6 to about 8. For this reason, the use of salts of the carboxylic acids and amino acids are preferred. The reaction is conducted over the range of from about −10° C. to about 50° C., and preferably at from about 0° C. to about 30° C. to avoid degradation of reactants and products. Higher temperatures can be used when the carboxylic acid reactant is other than an α-carboxyarylmalonic acid, e.g., phenylmalonic acid, but appear to offer no advantage.

The reaction proceeds rapidly and generally requires no more than a few minutes to reach completion. The first step involving reaction of the carboxylic acid or salt thereof with the hexahalocyclotriphosphatriazine normally requires less than one hour and frequently no more than one-half hour for substantially complete reaction. The second step, reaction of the activated acid with the amino acid, is also generally complete in about one hour or less.

The products are recovered by procedures well known to those skilled in the art. A typical recovery comprises adjusting the apparent pH of the reaction mixture to 2 to 3 with a mineral acid, e.g., hydrochloric acid, followed by filtration to remove any solid formed. The filtrate is extracted successively with a saturated aqueous solution of sodium bicarbonate and water, then dried, e.g., over anhydrous sodium sulfate or magnesium sulfate, and evaporated. In a modification of this recovery procedure, the dried filtrate is not taken to dryness but is treated with a suitable base, e.g., N-ethylpiperidine, or sodium ethyl hexanoate, to precipitate the corresponding salt of the penicillin or cephalosporin product.

In still another method, the reaction mixture is extracted with a saturated aqueous solution of sodium bicarbonate; the aqueous extract adjusted to about pH 2 then extracted with methylene chloride or other water immiscible solvent, e.g., n-butanol, methyl isobutyl ketone. The methylene chloride extract is dried then treated with a suitable base, e.g., an organic base, such as N-ethylpiperidine, to precipitate the corresponding amine salt of the product.

The following examples are provided to illustrate in greater detail the manner of practicing the present invention. They are, however, not to be considered as limiting the scope thereof in any way.

EXAMPLE I

A solution of phenylacetic acid (0.05 mole), triethylamine (0.05 mole) and methylene chloride (100 ml.) is stirred at room temperature for one-half hour than added to a solution of hexachlorocyclotriphosphatriazine (0.05 mol) in methylene chloride (100 ml.) and stirring continued for fifteen minutes. A solution of the triethylamine salt of 6-aminopenicillanic acid (0.05 mole) in methylene chloride (100 ml.) is added to the mixture over a ten-minute period at room temperature. Stirring is continued for ten minutes.

The reaction mixture is adjusted to pH 2 with 6 N hydrochloric acid then washed successively with saturated aqueous sodium bicarbonate (3× 50 ml.) and water (2× 50 ml.), then dried with anhydrous sodium sulfate. The product is isolated by treatment with an acetone solution of sodium-2-ethylhexanoate (0.05 mole). After stirring for one hour at room temperature, the product is removed by filtration and dried.

In like manner, the following penicillins are prepared from the appropriate acid:

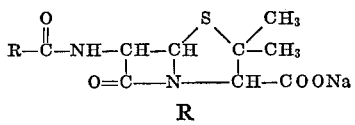

phenoxymethyl
α-phenoxyethyl
phenylmercaptomethyl
phenyl
n-heptyl
allylmercaptomethyl
β-chloroethyl
2-quinolinyl
methyl
hexadecyl cinnamyl
β-(p-methoxyphenethyl)
α-naphthyl
2,6-dimethoxyphenyl
p-methoxybenzyl
α-acetoxybenzyl
α-acetamidobenzyl
5-methyl-3-phenyl-4-isoxazolyl
allyl
3-indolylmethyl

EXAMPLE II

The procedure of Example I is repeated but using the following solvents, molar proportion of reactants, and temperature:

| PA[a] | Base | HCPT[b] | TEA[c] 6-APA | Solvent | Temperature, °C. |
|---|---|---|---|---|---|
| | TEA | 0.05 | 0.05 | THF[d] | 25 |
| | TEA | 0.05 | 0.05 | Dioxane | 20 |
| 0.05 | TEA | 0.05 | 0.05 | Ether | 20 |
| | TEA | 0.05 | 0.05 | EtOAc[e] | 30 |
| | TEA | 0.05 | 0.05 | Acetone | 20 |
| | TEA | 0.10 | 0.10 | CH$_2$Cl$_2$ | 30 |
| | TEA | 0.10 | 0.30 | Same | 30 |
| 0.03 | NaOH | 0.10 | 0.10 | ___do___ | 0 |
| | NaOH | 0.10 | 0.10 | ___do___ | 50 |
| | TEA | 0.03 | 0.03 | ___do___ | -10 |
| 0.05 | TEA | 0.50 | 0.05 | THF | 25 |
| 0.03 | KOH | 0.03 | 0.03 | MIBK[f] | 30 |
| 0.05 | TEA | 0.05 | 0.05 | THF | 25 |
| 0.03 | TEA | [g]0.10 | 0.10 | THF | 30 |
| 0.03 | KOH | 0.03 | 0.03 | CH$_2$Cl$_2$ | 50 |

[a] PA=Phenylacetic acid.
[b] HCPT=Hexachlorocyclotriphosphatriazine.
[c] TEA-6-APA=Triethylamine salt of 6-aminopenicillanic acid.
[d] THF=Tetrahydrofuran.
[e] EtOAc=Ethyl acetate.
[f] MIBK=Methyl isobutyl ketone.
[g] Hexabromocyclotriphosphatriazine used in place of the corresponding compound, hexachlorocyclotriphosphatriazine.

EXAMPLE III

The procedure of Example I is repeated but substituting the triethylamine salt of 7-aminocephalosporanic acid for 6-aminopenicillanic acid triethylamine salt to produce benzylcephalosporin.

The following compounds are produced by the same procedure from the appropriate reactants:

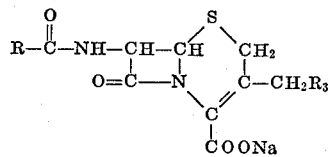

| R | R$_3$ | R | R$_3$ |
|---|---|---|---|
| 2-thienyl | Acetoxy | Benzyl | OH |
| p-Methoxybenzyl | do | Cyclopentylmethyl | OH |
| o-Chlorobenzyl | do | 2-thienylmercaptomethyl | OH |
| p-Acetamidobenzyl | do | Phenyl | OH |
| Cinnamyl | do | p-Nitrophenyl | OH |
| Cyclopentylmethyl | do | Phenoxymethyl | OH |
| n-Pentyl | do | α-Phenoxyethyl | OH |
| β-(β-naphthyl)vinyl | do | Cyclobutyl | OH |
| Adamantanylmethyl | do | Adamantanyl | OH |
| Benzyloxymethyl | do | β-Naphthyl | OH |
| 1-pyrazolylmethyl | do | Benzyl | H |
| β-(2-furyl)ethyl | do | α-Acetamidobenzyl | H |
| 2-thienylmercaptomethyl | do | 2-thenyl | H |
| 2,4-dichlorophenylmercaptomethyl | do | α-Acetamidoethyl | H |
| α-Dimethylamino-m-methoxybenzyl | do | α-(2-thienyl)propyl | OH |
| | | (1,2,4-triazol-1-yl)methyl | OH |
| α-Diethylamino--m-nitrophenethyl | OH | 1-methyl-2-pyrryl-methyl | OH |
| | | Isoamylmercaptomethyl | OH |
| α-Methyl-α-phenylmercaptoethyl | OH | 2-thianaphthenyl | H |
| | | 2,6-dimethylphenyl | H |
| α-Methoxy-4-chlorobenzyl | Acetoxy | 2,6-dimethylphenyl | OH |
| α-Methoxy-3,4-dichlorobenzyl | OH | Cyclohex-3-en-1-yl | H |
| 2-biphenylyl | OH | α-Furylmethyl | H |

EXAMPLE IV

α-Carbo-(2-isopropylphenoxy)benzylpenicillin
N-ethylpiperidine salt

A solution of α-(carbo-2-isopropylphenoxy)phenylacetic acid (14.8 g., 0.05 mole) and hexachlorocyclotriphosphatriazine (6.08 g., 0.0175 mole) in dry methylene chloride (70 ml.) is cooled at 0°–5° C. in an ice-bath. Triethylamine (5.05 g., 0.05 mole) is added and the mixture stirred at 0°–5° C. for one hour.

A slurry of 6-aminopenicillanic acid (10.8 g., 0.05 mole) and triethylamine (5.05 g., 0.05 mole) in dry methylene chloride (100 ml.) is then added over a five-minute period. The resulting mixture is stirred for two hours then extracted with a saturated aqueous solution of sodium bicarbonate (4× 50 ml.), followed by water (2× 50 ml.). The combined aqueous extracts are adjusted to pH 2.0 and extracted with methylene chloride (3× 50 ml.). The combined methylene chloride extracts are dried with magnesium sulfate, then filtered and treated with N-ethylpiperidine (8.45 g., 0.075 mole). The solution is seeded, stirred for one hour, then chilled overnight. The product is recovered by filtration, washed with methylene chloride and dried.

The above procedure is repeated but with isolation of the product as its sodium salt as follows:

The combined aqueous sodium bicarbonate and water extracts of the reaction mixture are adjusted to pH 2.0 then extracted with n-butanol (3× 50 ml.). The n-butanol extracts are dried with anhydrous sodium sulfate, filtered and treated with sodium 2-ethylhexanoate in acetone (40 ml. containing 207.5 mg. of salt per ml.) over a twenty-minute period. The mixture is stirred for one-half hour then acetone (200 ml.) added. The solution is seeded if necessary and the product recovered by filtration, washed with acetone and dried.

Replacement of sodium 2-ethylhexanoate by potassium 2-ethylhexanoate produces the potassium salt.

EXAMPLE V

α-Carbo(5-indanyloxy)benzylpenicillin
N-ethylpiperidine salt

A mixture of 6-aminopenicillanic acid (10.43 g., 0.052 mole) and triethylamine (5.35 g., 0.053 mole) in methylene chloride (100 ml.) is stirred at room temperature for thirty minutes then added to a solution of 2-phenyl-2 (5-indanyloxycarbonyl)acetic acid (6.08 g., 0.0175 mole), hexachlorocyclotriphosphatriazine (14.8 g., 0.05 mole), and triethylamine (5.05 g., 0.05 mole) in methylene chloride (50 ml.) with stirring at room temperature over a period of about five minutes. The temperature of the reaction rises from 25° to 29° C., and the pH is 7.7. After addition is complete, the reaction mixture is cooled at 0°–5° C. in an ice-water bath and stirred at 0° to 5° C. until no further pH change is observed. The final pH is 8.5. The reaction mixture is adjusted to pH 2.0 with 6 N HCl and extracted with methylene chloride. The organic layer is washed with saturated sodium bicarbonate (50 ml.) solution, the basic aqueous layer separate and acitified to pH 2 with 6 N HCl then re-extracted with methylene chlorine. The combined methylene chloride extract is washed with water, dried over MgSO$_4$ and filtered. The filtrate is cooled to 0° to 5° C. and treated dropwise with (5.76 g., 0.057 mole) of N-ethylpiperidine. An equal volume of dry n-hexane is then added. The crystalline N-ethylpiperidine salt is collected by filtration, washed with cold methylene chloride-n-hexane (1:), dry acetone, filtered and dried. Yield—2.25 g., M.P. 146–147° C. Neutralization equivalent (titration): Calcd. 607, found 606; Analysis Calcd. (percent): C=65.21; H=6.80; N= 6.91. Found (percent): C=64.49; H=6.79; N=7.00. Karl Fisher H$_2$O found 0.93%. Analysis corrected on C$_{33}$H$_{41}$O$_6$N$_3$S·0.93 H$_2$O (percent): Calcd. C=64.58; H=

6.82; N=7.00. Found (percent): C=64.49; H=6.79; N=7.00.

Thin layer chromatography showed one spot identical with that of an authentic sample. Nuclear magnetic resonance spectroscopy confirmed the assigned structure.

EXAMPLE VI

The following α-carboxy arylmethyl penicillin esters are prepared from the appropriate arylmalonic acid half ester and 6-aminopenicillanic acid by the procedure of Example IV:

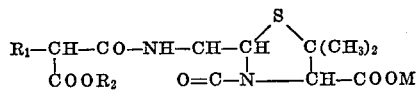

For each of the $R_2$ values listed, $R_1$=phenyl, 2-thienyl, 3-thienyl, 2-pyridyl, 2-furyl, o-tolyl, 3-furyl-, 3-pyridyl-, 4-pyridyl-, p-tolyl-, o-methoxyphenyl-, p-methoxyphenyl-, p-trifluoromethylphenyl-, p - chlorophenyl-, o-dimethylaminophenyl-, and p-dimethylaminophenyl.

| $R_2$: | M |
|---|---|
| methyl | Na |
| ethyl | Na |
| i-propyl | Na |
| t-butyl | Na |
| decyl | K |
| octadecyl | K |
| 2-chloroethyl | Na |
| 3-chloropropyl | NEP [1] |
| 1-methyl-3-chloropropyl | Na |
| 2-bromoethyl | K |
| 2-bromopropyl | K |
| 1,3-dichloropropyl | Na |
| 2-bromo-3-chloropropyl | Na |
| 2,3,3-tribromopropyl | Na |
| 2,2,2-trichloroethyl | Na |
| 2,2,2-trifluoroethyl | Na |
| 2-nitroethyl | K |
| 4-nitrobutyl | K |
| 2,2-dinitroethyl | Na |
| 2-chloro-2-nitropropyl | Na |
| 2-bromo-2-nitropropyl | Na |
| 2-chloro-2-nitrobutyl | Na |
| 2-methoxyethyl | K |
| 2-isobutoxyethyl | K |
| 4-butoxy-n-butyl | K |
| 2-cyanoethyl | K |
| 4-cyanobutyl | K |
| 1-cyano-2,2,2-trichloroethyl | K |
| 1-cyano-2,2,2-tribromoethyl | K |
| 2-formyloxyethyl | Na |
| 2-acetoxyethyl | Na |
| 2-butyryloxyethyl | NEP |
| 4-propionyloxy-n-butyl | NEP |
| carbomethoxymethyl | Na |
| carbobutoxymethyl | Na |
| 4-carbopropoxybutyl | Na |
| 1-chloromethyl-2-carbethoxyethyl | K |
| 1-carbopropoxy-2-chloropropyl | NEP |
| 1-carbomethoxy-2,2,2-trichloroethyl | NEP |
| acetonyl | Na |
| acetonylmethyl | Na |
| 4-oxopentyl | Na |
| 2-acetylpropyl | Na |
| 4-oxohexyl | Na |
| 1-methoxy-2,2,2-trichloroethyl | Na |
| 1-butoxy-2,2,2-trichloroethyl | Na |
| 1-ethoxy-2,2,2-trifluoroethyl | Na |
| 2,3-dibutyryloxypropyl | K |
| 2,3-dicaproyloxypropyl | K |
| 2,3-distearoyloxypropyl | K |
| (1,2,3-tricarbethoxy)-2-propyl | K |
| (1,2,3-tricarbobutoxy)-2-propyl | K |

| $R_2$ | M |
|---|---|
| 2-chloro-3,3-diethoxypropyl | K |
| 2-oxo-3-chloropropyl | K |
| 1-trichloromethyl-3-oxobutyl | K |
| 2-fluoroethyl | Na |
| 1-chloromethyl-2-fluoroethyl | Na |
| 2,2,3,3,4,4,4-heptafluorobutyl | Na |
| 1-trichloromethyl-2,3,3,3-tetrachloropropyl | Na |
| 2-chloro-3,3-difluoropropyl | Na |
| 1-methoxy-2-chloro-2,2-difluoroethyl | Na |
| 1-trifluoromethyl-2-nitroethyl | Na |
| dicarbethoxyethoxymethyl | NEP |
| carbethoxyethoxymethyl | Na |
| chlorodicarbomethoxymethyl | Na |
| 1-isopropoxy-2,2,2-trichloroethyl | Na |
| 1-t-butoxy-2,2,2-trichloroethyl | Na |
| dicarbomethoxyethoxymethyl | NEP |
| cyclopropyl | Na |
| cyclohexyl | Na |
| 1-methyl-1-cyclopentyl | Na |
| 2-methyl-1-cyclopentyl | Na |
| 2,3,4-trimethyl-1-cyclopentyl | K |
| 1-isopropyl-1-cyclopentyl | K |
| 1-methyl-1-cyclohexyl | K |
| 3-ethyl-1-indanyl | Na |
| 5-methyl-1-indanyl | Na |
| 2,3-dimethyl-1-indanyl | K |
| 4-chloro-1-indanyl | Na |
| 3-bromo-1-indanyl | Na |
| 1-chloro-2-indanyl | Na |
| 9-fluorenyl | K |
| 3-isobutyl-5-methyl-1-cyclohexyl | K |
| 2,2,4,4,6-pentamethyl-1-cyclohexyl | K |
| 1-(2-methyl-1,2,3,4-tetrahydronaphthyl) | K |
| 1-(1,2,7-trimethyl-1,2,3,4-tetrahydronaphthyl) | K |
| 2-(1-methyl-1,2,3,4-tetrahydronaphthyl) | K |
| 1-(2-chloro-1,2,3,4-tetrahydronaphthyl) | K |
| 2-(1-bromo-1,2,3,4-tetrahydronaphthyl) | K |
| phenyl | Na |
| o-tolyl | Na |
| p-tolyl | Na |
| m-ethylphenyl | Na |
| o-isopropylphenyl | Na |
| p-t-butylphenyl | Na |
| o-methoxyphenyl | Na |
| p-n-butoxyphenyl | Na |
| o-chlorophenyl | Na |
| m-chlorophenyl | Na |
| m-bromophenyl | Na |
| m-fluorophenyl | Na |
| o-formylphenyl | NEP |
| p-butyrylphenyl | NEP |
| o-nitrophenyl | K |
| m-nitrophenyl | K |
| o-carbomethoxyphenyl | Na |
| p-carbomethoxyphenyl | Na |
| p-carbo-n-octyloxyphenyl | Na |
| o-dimethylaminophenyl | Na |
| o-di-n-butylaminophenyl | K |
| m-di-n-propylaminophenyl | K |
| p-methylethylaminophenyl | K |
| 2,3-dimethylphenyl | K |
| 2,6-di-n-propylphenyl | K |
| 3-methyl-4-t-butylphenyl | Na |
| pentamethylphenyl | Na |
| 2,6-dichlorophenyl | Na |
| 2,4-dibromophenyl | Na |
| 2,3,4,6-tetrabromophenyl | Na |
| pentachlorophenyl | Na |
| 2,4-dinitrophenyl | Na |
| pentanitrophenyl | Na |
| 2,6-difluorophenyl | Na |
| pentafluorophenyl | Na |
| 3-chloro-2-fluorophenyl | Na |

| $R_2$ | M |
|---|---|
| 2-bromo-4-fluorophenyl | Na |
| 2-methoxy-4-methylphenyl | Na |
| 4-bromo-3-methoxyphenyl | Na |
| 2-chloro-6-methoxyphenyl | Na |
| 2-carbomethoxy-5-fluorophenyl | K |
| 5-fluoro-2-methoxyphenyl | K |
| 2-acetyl-4-fluorophenyl | K |
| 4-chloro-2,3-dimethylphenyl | K |
| 4-chloro-2,6-dinitrophenyl | K |
| 2-fluoro-4-butyrylphenyl | K |
| 2-acetyl-4-chlorophenyl | K |
| 4-acetyl-2-bromophenyl | K |
| 2-acetyl-6-dimethylaminophenyl | K |
| 4-carbomethoxy-2-dimethylaminophenyl | K |
| 2,6-dimethoxyphenyl | Na |
| m-acetylphenyl | K |
| 3-carbomethoxy-5-methoxyphenyl | K |
| 3,4-dicarbethoxyphenyl | K |
| 4-carbomethoxy-2,6-dimethoxyphenyl | K |
| 4-indanyl | NEP |
| 5-indanyl | NEP |
| 1-methyl-4-indanyl | NEP |
| 6-methyl-4-indanyl | NEP |
| 1-methyl-5-indanyl | Na |
| 7-methyl-5-indanyl | Na |
| 6-t-butyl-5-indanyl | Na |
| 1,1,2-trimethyl-4-indanyl | Na |
| 5-chloro-4-indanyl | Na |
| 7-bromo-4-indanyl | Na |
| 6-chloro-5-indanyl | Na |
| 4-(1-indanyl)phenyl | K |
| 2,4-(dicyclopent-2-enyl)phenyl | K |
| 4-($\alpha,\alpha$-dimethylbenzyl)phenyl | K |
| 1-naphthyl | NEP |
| 2-naphthyl | NEP |
| 1-(5,6,7,8-tetrahydronaphthyl) | Na |
| 2-(5,6,7,8-tetrahydronaphthyl) | Na |
| 3-(2-methyl-4-pyronyl) | Na |
| 3-quinolyl | K |
| 8-quinolyl | K |
| 5-(1,4-naphthoquinonyl) | Na |
| 6-(1,4-naphthoquinonyl) | Na |
| 4-(coumarinyl) | K |
| 3-thianaphthenyl | Na |
| 4-thianaphthenyl | Na |
| 1-phenazinyl | K |
| 2-phenazinyl | K |
| 2-(anthraquinonyl) | Na |
| 4-(6-methylquinolyl) | K |
| 1-fluorenyl | Na |
| 2-fluorenyl | Na |
| 6-(1,2-naphthoquinonyl) | Na |
| 7-(1,2-naphthoquinonyl) | Na |
| 1-anthraquinonyl | Na |
| 7-isoquinolyl | K |
| 8-isoquinolyl | K |
| 5-(1,3-benzodioxolyl) | K |
| 3-(4-pyronyl) | K |
| 1-(3-methyl-5,6,7,8-tetrahydronaphthyl) | Na |
| 2-(1-methyl-5,6,7,8-tetrahydronaphthyl) | Na |
| 2-(1,6-dimethyl-5,6,7,8-tetrahydronaphthyl) | K |
| 1-(3,4,6-trimethyl-5,6,7,8-tetrahydronaphthyl) | K |
| 3-bromo-2-propionylphenyl | K |
| 2-carbomethoxy-5-methoxy-4-nitrophenyl | K |
| 2-furyl | NEP |
| 3-furyl | NEP |
| 2-(1,4-naphthoquinonyl) | K |
| 2-dimethylaminoethyl | K |
| 2-diisopropylaminoethyl | K |
| 3-dibutylaminopropyl | K |
| 2-(2-imidazolino)ethyl | K |
| 2-piperidinoethyl | H |
| 2-pyrrolidinoethyl | NEP |
| 3-morpholinopropyl | NEP |
| 3-thiomorpholinopropyl | NEP |
| 2-(1,4,5,6-tetrahydropyrimidino)ethyl | Na |
| 2-(N-methyl)piperazinoethyl | NEP |
| 3-N-butylpiperazinopropyl | NEP |
| 2-(2,5-dimethylpyrrolidino)ethyl | K |
| 2-aziridinoethyl | K |
| 2-thiomorpholinoethyl | Na |
| pyrrolidinomethyl | K |
| aziridinomethyl | K |
| (2-imidazolino)methyl | K |
| piperidinomethyl | K |
| morpholinomethyl | K |
| thiomorpholinomethyl | NEP |
| 2-diethylamino-1-propyl | K |
| 3-pyrrolidino-2-propyl | K |
| 3-piperidino-2-propyl | K |
| 3-morpholino-2-propyl | K |
| 3-dimethylamino-2-propyl | K |
| 2-thiomorpholino-1-propyl | K |
| 2-(2-imidazolino)-1-propyl | K |
| 3-(1,4,5,6-tetrahydropyrimidino)-2-propyl | K |
| 2-acetamidoethyl | K |
| 2-butyramidoethyl | K |
| 2-acetamido-1-propyl | K |
| 2-(ethylbutylamino)ethyl | K |
| 3-imidazolo-2-propyl | K |
| 3-pyrrolo-2-propyl | K |
| 2-morpholino-1-propyl | K |
| 3-(2-imidazolino)-2-propyl | K |
| 2-(2,6-dimethylpiperidino)ethyl | K |
| 2-di-(n-propyl)amino-1-propyl | K |
| 2-(N-methylanilino)ethyl | Na |
| 2-(N-isopropylanilino)ethyl | K |
| 3-(N-n-butylanilino)-2-propyl | K |
| 2-(N-methylanilino)-1-propyl | K |
| 3-pyrrolidinopropyl | Na |
| 3-pyrrolopropyl | Na |
| 2-imidazoloethyl | Na |
| 4-pyridylmethyl | Na |
| 4-imidazolylmethyl | Na |
| phthalimidomethyl | Na |
| 4-(N-methyl)pyridyl | K |
| allyl | Na |
| crotyl | Na |
| 2-hexen-1-yl | K |
| 4-octen-1-yl | Na |
| propargyl | Na |
| 3-octyn-1-yl | Na |
| 3-octyn-2-yl | Na |
| benzyl | Na |
| o-chlorobenzyl | Na |
| p-bromobenzyl | Na |
| m-methylbenzyl | Na |
| p-ethylbenzyl | Na |
| o-nitrobenzyl | K |
| m-nitrobenzyl | K |
| o-methoxybenzyl | K |
| p-ethoxybenzyl | K |
| m-acetylbenzyl | K |
| p-butyrylbenzyl | K |
| o-carbomethoxybenzyl | Na |
| p-(carbo-t-butoxy)benzyl | Na |
| o-fluorobenzyl | Na |
| o-dimethylaminobenzyl | K |
| p-dimethylaminobenzyl | K |
| benzohydryl | Na |
| trityl | Na |
| cholesteryl | Na |
| 2-furylmethyl | Na |
| [2,2-dimethyl-1,3-dioxolon-4-yl]-methyl | Na |

[1] NEP=N-ethylpiperidine.

EXAMPLE VII

Again following the procedure of Example IV, the following α-carboxyarylmethyl penicillin esters wherein the aryl group, $R_1$, for each of the $R_2$ values given, is m-tolyl, m-methoxyphenyl, m-trifluoromethylphenyl, o-isopropylphenyl, o-chlorophenyl, o-bromophenyl, m-bromophenyl, m-chlorophenyl, o-butoxyphenyl, o-butylphenyl, o-diethylaminophenyl, p-di-(n-propyl)-aminophenyl, o-dibutylaminophenyl, and m-dimethylaminophenyl, are prepared:

| $R_2$ | M |
|---|---|
| methyl | Na |
| n-butyl | Na |
| octadecyl | K |
| 2-chloroethyl | Na |
| 4-chloro-1-butyl | Na |
| 2-bromoethyl | K |
| 1,1-dichloromethylethyl | Na |
| 2,2-dichloroethyl | Na |
| 2,2,3-trichlorobutyl | Na |
| 2,2,2-trichloroethyl | Na |
| 2,2,2-trifluoroethyl | Na |
| 3-nitrobutyl | K |
| 2,2-dinitroethyl | Na |
| 2-chloro-2-nitropropyl | Na |
| 2-bromo-2-nitropropyl | Na |
| 1-trichloromethyl-2-nitroethyl | Na |
| 2-methoxyethyl | K |
| 2-isopropoxyethyl | K |
| 4-butoxy-n-butyl | K |
| 3-cyanopropyl | K |
| 1-cyano-2-chloropropyl | K |
| 1-cyano-2,2,2-trichloroethyl | K |
| 3-acetoxypropyl | Na |
| carbomethoxymethyl | Na |
| 2-carbethoxyethyl | Na |
| 4-carbethoxybutyl | Na |
| 1-trichloromethyl-2-carbomethoxyethyl | K |
| acetonyl | Na |
| 1-methyl-4-oxopentyl | Na |
| 2-acetylbutyl | Na |
| 5-oxohexyl | Na |
| 1-methoxy-2,2,2-trichloroethyl | Na |
| 1-methoxy-2,2,2-trifluoroethyl | Na |
| 1-ethoxy-2,2,2-trifluoroethyl | Na |
| 2,3-diacetoxypropyl | K |
| 2,3-distearoyloxypropyl | K |
| (1,2,3-tricarbomethoxy)-2-propyl | K |
| 3,3-diethoxypropyl | K |
| 2-oxo-3-chloropropyl | K |
| 3-fluoropropyl | Na |
| 1-methoxy-2-chloro-2,2-difluoroethyl | Na |
| dicarbethoxyethoxymethyl | Na |
| carbethoxyethoxymethyl | Na |
| chlorodicarbomethoxymethyl | Na |
| bromodicarbomethoxymethyl | Na |
| dicarbomethoxyethoxymethyl | Na |
| phenyl | NEP [1] |
| o-tolyl | Na |
| m-n-propylphenyl | Na |
| o-isopropylphenyl | NEP |
| p-t-butylphenyl | Na |
| m-methoxyphenyl | Na |
| o-ethoxyphenyl | Na |
| p-n-butoxyphenyl | Na |
| o-chlorophenyl | NEP |
| m-bromophenyl | Na |
| p-fluorophenyl | Na |
| m-formylphenyl | Na |
| o-acetylphenyl | Na |
| p-butyrylphenyl | Na |
| m-nitrophenyl | K |
| p-nitrophenyl | K |
| m-carbomethoxyphenyl | Na |
| o-carbethoxyphenyl | Na |
| o-dimethylaminophenyl | K |
| o-di-n-butylaminophenyl | K |
| m-di-n-propylaminophenyl | K |
| p-methylisopropylaminophenyl | K |
| 2,4-diethylphenyl | K |
| 2-methyl-6-n-propylphenyl | K |
| pentamethylphenyl | Na |
| 2,6-dichlorophenyl | Na |
| 2,4,6-tribromophenyl | Na |
| pentachlorophenyl | Na |
| pentanitrophenyl | Na |
| pentafluorophenyl | Na |
| 4-bromo-3,5-difluorophenyl | Na |
| 3-fluoro-2,4,6-trifluorophenyl | Na |
| 5-bromo-2-methoxyphenyl | Na |
| 2-chloro-6-methoxyphenyl | Na |
| 2-ethoxy-3-methylphenyl | K |
| 2-carbomethoxy-5-fluorophenyl | K |
| 5-fluoro-2-methoxyphenyl | K |
| 2-acetyl-4-fluorophenyl | K |
| 4-fluoro-3-methylphenyl | K |
| 2-bromo-4-t-butylphenyl | Na |
| 4-chloro-2,3-dimethylphenyl | K |
| 4-chloro-2,6-dinitrophenyl | K |
| 4-chloro-5-fluoro-2-nitrophenyl | K |
| 4-acetyl-2-fluoro-5-nitrophenyl | K |
| 4-chloro-2-propionylphenyl | Na |
| 4-dimethylamino-2-methylphenyl | K |
| 4-carbomethoxy-2-dimethylaminophenyl | K |
| 2-methoxy-5-nitro-4-propylphenyl | Na |
| 2,6-dimethoxyphenyl | Na |
| m-acetylphenyl | K |
| 3-carbomethoxy-5-methoxyphenyl | K |
| 3,4-dicarbethoxyphenyl | K |
| 4-indanyl | NEP |
| 5-indanyl | NEP |
| 5-methyl-4-indanyl | Na |
| 3-methyl-4-indanyl | Na |
| 1-methyl-5-indanyl | Na |
| 6-t-butyl-5-indanyl | Na |
| 5-chloro-4-indanyl | Na |
| 6-chloro-5-indanyl | Na |
| 1,7-dimethyl-4-indanyl | K |
| 4-(1-indanyl)phenyl | K |
| 2,4-(dicyclopent-2-enyl)phenyl | K |
| 4-(α,α-dimethylbenzyl)phenyl | K |
| 1-naphthyl | NEP |
| 2-naphthyl | NEP |
| 1-(5,6,7,8-tetrahydronaphthyl) | Na |
| 2-(5,6,7,8-tetrahydronaphthyl) | Na |
| 3-(2-methyl-4-pyronyl) | Na |
| 4-quinolyl | K |
| 7-quinolyl | K |
| 5-(1,4-naphthoquinonyl) | Na |
| 6-(counmarinyl) | K |
| 4-thianaphthenyl | Na |
| 1-phenazinyl | K |
| 2-phenazinyl | K |
| 2-(anthraquinonyl) | Na |
| 4-(6-methylquinolyl) | Na |
| 1-fluorenyl | Na |
| 2-fluorenyl | Na |
| 6-(1,2-naphthoquinonyl) | Na |
| 7-(1,2-napthoquinonyl) | Na |
| 1-anthraquinonyl | Na |
| 7-isoquinolyl | K |
| 5-(1,3-benzodioxolyl) | K |
| 3-(4-pyronyl) | K |
| 1-(3-methyl-5,6,7,8-tetrahydronaphthyl) | Na |
| 2-(4-methyl-5,6,7,8-tetrahydronaphthyl) | Na |
| 2-acetyl-5-dimethylaminophenyl | K |

| R₂ | M |
|---|---|
| 2-acetyl-5-ethoxyphenyl | Na |
| 2-furyl | K |
| 3-furyl | K |
| cyclobutyl | Na |
| cyclohexyl | Na |
| 2-methyl-1-cyclopentyl | Na |
| 4-t-butyl-1-cyclohexyl | K |
| 1-chloro-2-indanyl | K |
| 2-bromo-1-indanyl | K |
| 1-methyl-1-cycloheptyl | K |
| 1-(1,2,3,4-tetrahydronaphthyl) | K |
| 1-indanyl | K |
| 2-indanyl | K |
| 2-methyl-1-indanyl | K |
| 1-ethyl-1-indanyl | K |
| 2-bicyclo[4.4.0]-decyl | Na |
| 7-adamantanyl | Na |
| fenchyl | K |
| 1-(1-methyl-1,2,3,4-tetrahydronaphthyl) | K |
| 2-(3-chloro-1,2,3,4-tetrahydronaphthyl) | K |
| 2-piperidinoethyl | K |
| 2-morpholinoethyl | K |
| 3-thiomorpholinopropyl | K |
| 2-pyrrolidinoethyl | K |
| 3-pyrrolopropyl | K |
| 3-di-(n-propylamino)-2-propyl | K |
| 3-pyrrolidinopropyl | K |
| 2-dimethylaminoethyl | NEP |
| 2-imidazoloethyl | NEP |
| 2-azetidinoethyl | K |
| 3-dimethylaminopropyl | K |
| 3-diisopropylaminopropyl | K |
| 3-aziridinopropyl | K |
| 3-(N-methylpiperazino)propyl | K |
| 3-(2-imidazolino)propyl | K |
| 3-(1,4,5,6-tetrahydropyrimidino)propyl | K |
| 2(2-imidazolino)methyl | Na |
| piperidinomethyl | Na |
| 2-pyrrolidino-1-propyl | Na |
| 2-morpholino-1-propyl | Na |
| 2-pyrrolo-1-propyl | Na |
| 2-imidazolo-1-propyl | Na |
| 3-imidazolo-2-propyl | Na |
| 3-(2-imidazolino)-2-propyl | Na |
| 2-(methylethylamino)ethyl | Na |
| 3-(methylethylamino)-2-propyl | Na |
| 2-(methylbutylamino)-1-propyl | Na |
| 2-acetamidoethyl | Na |
| 3-acetamido-2-propyl | Na |
| 2-diethylamino-1-propyl | K |
| 3-piperidino-2-propyl | K |
| 3-diethylamino-2-propyl | K |
| 3-morpholino-2-propyl | K |
| 2-(2,6-dimethylpiperidino)ethyl | K |
| 3-(N-methylanilino)propyl | K |
| 3-(N-methylanilino)-2-propyl | K |
| 2-(N-methylanilino)-1-propyl | K |
| 2-pyridylmethyl | Na |
| 4-imidazolylmethyl | Na |
| phthalimidomethyl | Na |
| 3-(N-methyl)pyridyl | K |
| allyl | Na |
| crotyl | Na |
| 2-hepten-1-yl | K |
| propargyl | Na |
| 3-octyn-1-yl | Na |
| benzyl | Na |
| p-chlorobenzyl | Na |
| o-bromobenzyl | Na |
| p-methylbenzyl | Na |
| o-ethylbenzyl | Na |
| m-nitrobenzyl | K |
| m-methoxybenzyl | K |
| p-acetylbenzyl | K |
| p-carbomethoxybenzyl | Na |
| p-fluorobenzyl | Na |
| o-dimethylaminobenzyl | K |
| benzohydryl | Na |
| trityl | Na |
| cholesteryl | Na |
| 2-furylmethyl | Na |
| [2,2-dimethyl-1,3-dioxolon-4-yl]-methyl | Na |
| (2-pyrrolidono)methyl | Na |
| 1-indanylmethyl | Na |

[1] NEP=N-ethylpiperidine.

EXAMPLE VIII

Following the procedure of Example IV but using the appropriate 7-aminocephalosporanic acid derivative in place of 6-aminopenicillanic acid, the α-carboxyarylmethylcephalosporin esters listed below are prepared:

$$R_1-CH-CO-NH-CH-CH \begin{array}{c} S \\ \diagup \diagdown \\ \end{array} CH_2 \\ | \qquad\qquad\qquad | \qquad | \\ COOR_2 \qquad O=C-N \quad C-CH_2-R_3 \\ \qquad\qquad\qquad\quad | \\ \qquad\qquad\qquad\quad COOM$$

For each of the R₂ values listed, R₁=2-thienyl, phenyl, p-chlorophenyl, o-methoxyphenyl, 3-thienyl, 2-pyridyl, 2-furyl and o-tolyl. The presentation of more than one value under R₃ for a given R₂ value indicates preparation of each of these cephalosporin derivatives.

| R₂ | R₃ | M |
|---|---|---|
| Methyl | H, OH, acetoxy | Na |
| Ethyl | Acetoxy | Na |
| t-Butyl | H, acetoxy | Na |
| Octadecyl | H, OH, acetoxy | K |
| 2-chloroethyl | H, acetoxy | Na |
| 4-chloro-1-butyl | OH, acetoxy | Na |
| 2-bromoethyl | Acetoxy | K |
| 1,3-dichloropropyl | do | Na |
| 2-bromo-3-chloropropyl | H | Na |
| 2,2,3,3-tetrabromopropyl | Acetoxy | Na |
| 2,2,2-trichloroethyl | H, OH, acetoxy | Na |
| 3,3,3-trifluoropropyl | do | Na |
| 2-nitroethyl | do | K |
| 4-nitrobutyl | Acetoxy | K |
| 2,2-dinitroethyl | do | Na |
| 2-chloro-2-nitrobutyl | H, acetoxy | Na |
| 2-methoxyethyl | H, OH, acetoxy | K |
| 2-n-butoxyethyl | do | K |
| 4-methoxy-n-butyl | Acetoxy | K |
| 2-cyanoethyl | H, OH, acetoxy | K |
| 4-cyanobutyl | OH | K |
| 1-cyano-2-chloropropyl | OH, acetoxy | K |
| 1-cyano-2,2,2-trichloroethyl | Acetoxy | K |
| 2-acetoxyethyl | H, acetoxy | NEP |
| 2-butyryloxyethyl | OH, acetoxy | Na |
| 2-acetoxy-n-butyl | Acetoxy | Na |
| Carbomethoxymethyl | OH, acetoxy | Na |
| 3-carbobutoxypropyl | H, OH | Na |
| 1-carbomethoxy-2-chloroethyl | H, acetoxy | K |
| Acetonyl | H, OH, acetoxy | Na |
| 4-oxohexyl | Acetoxy | Na |
| 1-methoxy-2,2,2-trichloroethyl | H, acetoxy | Na |
| 1-butoxy-2,2,2-trichloroethyl | OH, acetoxy | Na |
| 1-ethoxy-2,2,2-trifluoroethyl | H, OH | Na |
| 2,3-diacetoxypropyl | H, OH, acetoxy | K |
| 2,3-distearoyloxypropyl | do | K |
| (1,2,3-tricarbomethoxy)-2-propyl | H, OH | K |
| (1,2,3-tricarbobutoxy)-2-propyl | Acetoxy | K |
| 3,3-diethoxypropyl | H, acetoxy | K |
| 2-oxo-3-chloropropyl | Acetoxy | Na |
| 2-fluoroethyl | H | Na |
| Phenyl | H, OH, acetoxy | NEP |
| m-Tolyl | Acetoxy | Na |
| p-Tolyl | do | Na |
| o-Ethylphenyl | do | Na |
| o-Isopropylphenyl | H, OH, acetoxy | NEP |
| p-t-Butylphenyl | Acetoxy | NEP |
| o-Methoxyphenyl | H, OH, acetoxy | Na |
| m-Ethoxyphenyl | H | Na |
| p-n-Butoxyphenyl | OH | Na |
| o-Chlorophenyl | H, OH, acetoxy | Na |
| m-Bromophenyl | OH | Na |
| p-Fluorophenyl | H | Na |
| o-Formylphenyl | Acetoxy | Na |
| m-Acetylphenyl | H, OH | Na |
| p-Butyrylphenyl | Acetoxy | Na |
| o-Nitrophenyl | H, OH | K |
| m-Nitrophenyl | Acetoxy | K |
| m-Carbomethoxyphenyl | do | Na |
| p-Carbo-n-propoxyphenyl | H, OH | Na |

| R₂ | R₃ | M |
|---|---|---|
| o-Dimethylaminophenyl | H, OH, acetoxy | NEP |
| p-di-n-butylaminophenyl | Acetoxy | K |
| m-di-n-propylaminophenyl | do | K |
| 2,6-dimethylphenyl | H, OH, acetoxy | K |
| Pentamethylphenyl | Acetoxy | Na |
| 2,6-dichlorophenyl | H, OH, acetoxy | Na |
| 2,4-dibromophenyl | Acetoxy | Na |
| Pentachlorophenyl | do | Na |
| 3,5-dinitrophenyl | OH, acetoxy | Na |
| Pentafluorophenyl | H, acetoxy | NEP |
| 5-bromo-2-methoxyphenyl | Acetoxy | Na |
| 2-chloro-6-methoxyphenyl | H, OH, acetoxy | Na |
| 2-ethoxy-3-methylphenyl | OH, acetoxy | K |
| 2-carbomethoxy-5-fluorophenyl | Acetoxy | K |
| 5-fluoro-2-methoxyphenyl | do | K |
| 2-acetyl-4-fluorophenyl | H | K |
| 6-chloro-2-methylphenyl | OH | Na |
| 2-bromo-4-t-butylphenyl | OH | Na |
| 4-chloro-2,3-dimethylphenyl | H, acetoxy | K |
| 4,6-dibromo-2-methylphenyl | H | K |
| 4-chloro-2-nitrophenyl | Acetoxy | K |
| 3-fluoro-4-nitrophenyl | do | K |
| 2-acetyl-6-bromo-4-fluorophenyl | OH | K |
| 5-(1,3-benzodioxolyl) | H, OH, acetoxy | K |
| 2-acetyl-3,5-dichlorophenyl | Acetoxy | Na |
| 2-acetyl-6-dimethylaminophenyl | H, OH, acetoxy | K |
| 4-dimethylamino-2-methylphenyl | Acetoxy | K |
| 4-carbomethoxy-2-dimethylaminophenyl. | do | K |
| 4-t-butyl-3-nitrophenyl | do | Na |
| 2,6-dimethoxyphenyl | H, OH, acetoxy | Na |
| 3,4,5-trimethoxyphenyl | Acetoxy | Na |
| 2-carbomethoxy-6-methoxyphenyl. | do | K |
| 3,4-dicarbethoxyphenyl | H | K |
| 2,6-dicarbomethoxyphenyl | H, OH | K |
| 4-indanyl | H, OH, acetoxy | NEP |
| 5-indanyl | do | NEP |
| 1-methyl-4-indanyl | H | Na |
| 7-methyl-4-indanyl | H | Na |
| 6-t-butyl-5-indanyl | Acetoxy | Na |
| 4,6-dimethyl-5-indanyl | do | Na |
| 6-bromo-4-indanyl | H, acetoxy | Na |
| 6-chloro-5-indanyl | OH, acetoxy | Na |
| 4-(1-indanyl)phenyl | Acetoxy | Na |
| 1-naphthyl | H, OH, acetoxy | NEP |
| 2-naphthyl | H | NEP |
| 1-(5,6,7,8-tetrahydronaphthyl) | Acetoxy | Na |
| 2-(5,6,7,8-tetrahydronaphthyl) | H, acetoxy | Na |
| 3-(2-methyl-4-pyronyl) | Acetoxy | Na |
| 4-quinolyl | H, acetoxy | K |
| 8-quinolyl | OH | K |
| 6-(1,4-naphthoquinonyl) | OH | Na |
| 4-(coumarinyl) | H, OH | K |
| 3-thianaphthyl | Acetoxy | Na |
| 1-phenazinyl | do | K |
| 2-(anthraquinonyl) | H, acetoxy | Na |
| 2-fluorenyl | H | Na |
| 6-(1,2-naphthoquinonyl) | H | Na |
| 1-anthraquinonyl | OH | Na |
| 8-isoquinolyl | Acetoxy | K |
| 3-(4-pyronyl) | H, OH | K |
| 1-(3-methyl-5,6,7,8-tetrahydronaphthyl). | Acetoxy | Na |
| 2-(1-methyl-5,6,7,8-tetrahydronaphthyl). | H, OH | Na |
| 2-acetyl-5-dimethylaminophenyl. | Acetoxy | K |
| 2-furyl | H, OH | Na |
| 3-furyl | Acetoxy | K |
| Cyclopropyl | H, OH, acetoxy | Na |
| Cyclohexyl | do | Na |
| 1,2,4-trimethyl-1-cyclopentyl | H | K |
| 4-t-butyl-1-cyclohexyl | Acetoxy | K |
| 2,6-dimethyl-1-cyclohexyl | OH | K |
| 1-(1,2,3,4-tetrahydronaphthyl) | H, acetoxy | Na |
| 2,2-dimethyl-1-indanyl | Acetoxy | Na |
| 2-chloro-1-indanyl | H, acetoxy | Na |
| 3-bromo-1-indanyl | H | Na |
| 2-(1,2,3,4-tetrahydronaphthyl) | OH | Na |
| 1-indanyl | Acetoxy | K |
| 2-indanyl | H, OH | K |
| 3-bicyclo-[4.4.0]-decyl | Acetoxy | Na |
| 7-adamantanyl | H, acetoxy | Na |
| Thujyl | OH | K |
| Fenchyl | Acetoxy | K |
| 2-pyridylmethyl | H, acetoxy | Na |
| 4-imidazolylmethyl | OH, acetoxy | Na |
| 2-(N-phenylimidazolyl)methyl | Acetoxy | Na |
| Phthalimidomethyl | do | NEP |
| 2-(N-methylanilino)ethyl | do | Na |
| 2-dibutylaminoethyl | H, acetoxy | Na |
| 3-diethylaminopropyl | OH | H |
| 2-(2-imidazolino)ethyl | OH | H |
| 2-piperidinoethyl | H, OH | H |
| 3-thiomorpholinopropyl | Acetoxy | K |
| 2-(2-imidazolino)ethyl | do | K |
| 2-pyrroloethyl | H | H |
| 3-(N-butyl)piperazinopropyl | H | H |
| 2-(1,4,5,6-tetrahydropyrimidino)-ethyl | H | K |
| 3-imidazolopropyl | H, OH | K |
| 2-diethylamino-1-propyl | H, acetoxy | K |
| 3-pyrrolidino-2-propyl | OH | K |
| 3-piperidino-2-propyl | H | K |
| 3-diethylamino-2-propyl | Acetoxy | K |
| 3-morpholino-2-propyl | do | K |
| 3-di-(n-butyl)amino-2-propyl | do | K |

| R² | R³ | M |
|---|---|---|
| 2-acetamidoethyl | H, OH, acetoxy | K |
| 3-butyramidopropyl | Acetoxy | K |
| 2-(methylethylamino)ethyl | H | K |
| 2-aziridinoethyl | Acetoxy | K |
| 2-(4-methylpiperidino)ethyl | H | K |
| 3-piperidinopropyl | Acetoxy | Na |
| 3-(2,6-dimethylpiperidino)propyl. | do | K |
| 3-(N-methylanilino)propyl | H, OH, acetoxy | K |
| 3-pyrrolo-2-propyl | Acetoxy | K |
| 2-(2-imidazolino)-1-propyl | do | K |
| Aziridinomethyl | H | K |
| Piperidinomethyl | H | K |
| N-ethylpiperazinomethyl | OH | K |
| 3-(N-methylanilino)-2-propyl | Acetoxy | K |
| Allyl | H, OH, acetoxy | Na |
| 2-octen-1-yl | Acetoxy | Na |
| Propargyl | H, OH, acetoxy | Na |
| 2-hexyn-1-yl | H | Na |
| Benzyl | H, OH, acetoxy | NEP |
| o-Chlorobenzyl | Acetoxy | Na |
| p-Bromobenzyl | H, OH | Na |
| m-Methylbenzyl | Acetoxy | Na |
| p-Ethylbenzyl | do | Na |
| o-Nitrobenzyl | H | K |
| m-Nitrobenzyl | OH | K |
| o-Methoxybenzyl | OH | K |
| p-Ethoxybenzyl | Acetoxy | K |
| p-Butyrylbenzyl | H | K |
| o-Carbomethoxybenzyl | H, OH | Na |
| o-Fluorobenzyl | OH | Na |
| o-Dimethylaminobenzyl | H, acetoxy | K |
| Benzohydryl | Acetoxy | NEP |
| Trityl | H, OH, acetoxy | Na |
| Cholesteryl | H | Na |
| 2-furylmethyl | H, acetoxy | Na |
| [2,2-diethyl-1,3-dioxolon-4-yl]-methyl. | Acetoxy | Na |
| (2-pyrrolidono)methyl | do | Na |

EXAMPLE IX

Again following the procedure of Example IV, other arylmalonic acid mono-esters are reacted with the appropriate 7-aminocephalosporanic acid derivative to produce the cephalosporins listed below wherein $R_1$ is 3-furyl, 3-pyridyl, 4-pyridyl, p-tolyl, p-methoxyphenyl, p-trifluoromethylphenyl, o-dimethylaminophenyl, p-dimethylaminophenyl, o-diethylaminophenyl, p-di(n-propyl)aminophenyl, o-dibutylaminophenyl, m-dimethylaminophenyl, m-tolyl, m-methoxyphenyl, m-trifluoromethylphenyl, o-isopropylphenyl, o-bromophenyl, m-bromophenyl, m-chlorophenyl, o-butoxyphenyl, o-butylphenyl, and o-chlorophenyl.

| R₂ | R₃ | N |
|---|---|---|
| Methyl | H, OH, acetoxy | Na |
| Tetradecyl | H, acetoxy | Na |
| 2-chloroethyl | H, OH, acetoxy | Na |
| 3-chloropropyl | Acetoxy | Na |
| 4-bromo-1-butyl | H | K |
| 2,2,2-trichloroethyl | H, acetoxy | Na |
| 3,3,3-trifluoropropyl | OH | Na |
| 2-nitroethyl | H, OH | K |
| 3-nitrobutyl | H, OH | K |
| 2-chloro-2-nitrobutyl | Acetoxy | Na |
| 2-n-butoxyethyl | H, acetoxy | K |
| 4-ethoxy-n-butyl | OH | K |
| 2-cyanoethyl | Acetoxy | K |
| 1-cyano-2,2,2-trichloroethyl | H, acetoxy | K |
| 1-cyano-2,2,2-tribromoethyl | OH | K |
| 2-acetoxyethyl | H, OH | Na |
| 3-butyryloxypropyl | Acetoxy | Na |
| Carbobutoxymethyl | H, acetoxy | Na |
| 4-carbethoxybutyl | OH | Na |
| Acetonyl | H, OH, acetoxy | Na |
| 4-oxohexyl | Acetoxy | Na |
| 1-ethoxy-2,2,2-trichloroethyl | H, acetoxy | Na |
| 1-butoxy-2,2,2-trifluoroethyl | Acetoxy | Na |
| 2,3-diacetoxypropyl | OH, acetoxy | K |
| 2,3-distearoyloxypropyl | H | K |
| (1,2,3-tricarbobutoxy)-2-propyl | Acetoxy | K |
| Dicarbethoxyethoxymethyl | H, OH, acetoxy | Na |
| Carbethoxyethoxymethyl | Acetoxy | Na |
| Chlorodicarbomethoxymethyl | H, acetoxy | Na |
| Phenyl | H, OH, acetoxy | Na |
| o-Tolyl | H, acetoxy | Na |
| m-Ethylphenyl | OH | Na |
| o-Isopropylphenyl | H, OH, acetoxy | Na |
| p-t-butylphenyl | Acetoxy | Na |
| o-Methoxyphenyl | H, acetoxy | Na |
| m-Ethoxyphenyl | OH | Na |
| p-n-butoxyphenyl | H | Na |
| o-Chlorophenyl | H, acetoxy | Na |
| m-Bromophenyl | OH | Na |
| p-Fluorophenyl | Acetoxy | Na |
| m-Formylphenyl | H, OH | Na |
| o-acetylphenyl | Acetoxy | Na |

| R₂ | R₃ | M |
|---|---|---|
| p-Butyrylphenyl | do | Na |
| o-nitrophenyl | H, acetoxy | K |
| m-Nitrophenyl | OH | K |
| o-Carbomethoxyphenyl | H | Na |
| p-Carbo-n-propoxyphenyl | Acetoxy | Na |
| o-Dimethylaminophenyl | H, OH, acetoxy | K |
| m-di-n-butylaminophenyl | Acetoxy | K |
| p-Methylisopropylaminophenyl | do | K |
| 2,3-dimethylphenyl | H, acetoxy | K |
| Pentamethylphenyl | H | Na |
| 2,6-dichlorophenyl | OH, acetoxy | Na |
| Pentachlorophenyl | Acetoxy | Na |
| 2,4-dinitrophenyl | H, OH | Na |
| Pentafluorophenyl | Acetoxy | Na |
| 2-bromo-4-fluorophenyl | do | Na |
| 2-chloro-6-methoxyphenyl | do | Na |
| 2-carbomethoxy-5-fluorophenyl | do | K |
| 4-chloro-2,3-dimethylphenyl | H, acetoxy | K |
| 4-chloro-2-nitrophenyl | Acetoxy | K |
| 2-fluoro-4-propionylphenyl | do | K |
| 2-acetyl-4-chlorophenyl | do | K |
| 2-acetyl-6-dimethylaminophenyl | H, acetoxy | K |
| 4-dimethylamino-2-methylphenyl | H, OH | K |
| 4-carbomethoxy-2-dimethylaminophenyl | Acetoxy | K |
| 2,3-dimethoxyphenyl | H, acetoxy | Na |
| m-Acetylphenyl | H | K |
| p-Propionylphenyl | H, OH | K |
| 2-carbomethoxy-4-methoxyphenyl | Acetoxy | K |
| 3,4-dicarbomethoxyphenyl | do | K |
| 4-indanyl | H, OH, acetoxy | Na |
| 5-indanyl | do | Na |
| 6-methyl-4-indanyl | Acetoxy | Na |
| 1-methyl-5-indanyl | H, acetoxy | Na |
| 6-t-butyl-5-indanyl | OH, acetoxy | Na |
| 7-chloro-4-indanyl | H, acetoxy | Na |
| 6-bromo-5-indanyl | H, OH | Na |
| 4(α,α-dimethylbenzyl)phenyl | Acetoxy | K |
| 2-naphthyl | H, OH, acetoxy | Na |
| 1-(5,6,7,8-tetrahydronaphthyl) | Acetoxy | Na |
| 2-(5,6,7,8-tetrahydronaphthyl) | H, OH | Na |
| 8-quinolyl | H, OH, acetoxy | K |
| 5-(1,4-naphthoquinonyl) | Acetoxy | Na |
| 4-(coumarinyl) | H, acetoxy | K |
| 3-thianaphthenyl | Acetoxy | Na |
| 2-phenazinyl | do | K |
| 2-(anthraquinonyl) | do | Na |
| 1-fluorenyl | H, OH | Na |
| 8-isoquinolyl | H, OH | K |
| 4-(1,3-benzodioxolyl) | Acetoxy | K |
| 2-furyl | H, OH, acetoxy | K |
| Cyclobutyl | H, acetoxy | Na |
| Cycloheptyl | OH | Na |
| 1-methyl-1-cyclohexyl | Acetoxy | K |
| 4-t-butyl-1-cyclohexyl | do | K |
| 2-chloro-1-indanyl | H, acetoxy | Na |
| 2-methyl-6-propyl-1-cyclohexyl | Acetoxy | Na |
| 2-(1,2,3,4-tetrahydronaphthyl) | do | Na |
| 1-indanyl | H, OH | Na |
| 2-indanyl | Acetoxy | Na |
| 2-bicyclo-[4.4.0]-decyl | do | Na |
| 7-adamantanyl | H, OH, acetoxy | Na |
| 2-dimethylaminoethyl | H, acetoxy | K |
| 2-piperidinoethyl | Acetoxy | K |
| 3-thiomorpholinopropyl | H, OH | K |
| 2-pyrrolidinoethyl | OH | K |
| 2-(2-imidazolino)ethyl | H | K |
| 2-pyrroloethyl | Acetoxy | K |
| 2-di(n-butyl)aminoethyl | OH | Na |
| 3-imidazolopropyl | H, acetoxy | K |
| Aziridinomethyl | Acetoxy | K |
| Morpholinomethyl | H, acetoxy | K |
| (1,4,5,6-tetrahydropyrimidino)methyl | Acetoxy | K |
| Pyrrolomethyl | H, OH | K |
| 3-diisopropylamino-2-propyl | Acetoxy | K |
| 2-dimethylamino-1-propyl | do | K |
| 2-(N-ethylanilino)ethyl | H, acetoxy | K |
| 3-(N-isopropylanilino)propyl | H, OH | K |
| 2-(N-methylanilino)-1-propyl | H | K |
| 3-(2-imidazolino)-2-propyl | H | Na |
| 3-(4-methylpiperidino)-2-propyl | Acetoxy | Na |
| 2-morpholino-1-propyl | H, OH | Na |
| 2-thiomorpholino-1-propyl | Acetoxy | Na |
| 2-butyramidoethyl | H, acetoxy | Na |
| 3-acetamidopropyl | OH | Na |
| 2-acetamido-1-propyl | OH, acetoxy | K |
| 2-piperidinoethyl | H | K |
| 3-piperidinopropyl | Acetoxy | K |
| 3-di-(n-propylamino)-2-propyl | do | K |
| 3-pyrrolidino-2-propyl | H | K |
| 3-piperidino-2-propyl | Acetoxy | K |
| 3-di-(n-butyl)amino-2-propyl | H | K |
| 3-dimethylamino-2-propyl | Acetoxy | K |
| 2-azetidinoethyl | H | K |
| 3-azetidino-2-propyl | H | K |
| 2-pyridylmethyl | OH | Na |
| Phthalimidomethyl | Acetoxy | Na |
| Benzyl | H, OH, acetoxy | Na |
| o-Chlorobenzyl | Acetoxy | Na |
| p-Bromobenzyl | H, OH | Na |
| m-Methylbenzyl | H | Na |
| o-Nitrobenzyl | Acetoxy | K |
| p-Ethoxybenzyl | H, acetoxy | K |
| m-Acetylbenzyl | OH, acetoxy | K |
| o-Carbomethoxybenzyl | Acetoxy | K |
| o-Fluorobenzyl | H | K |
| p-Dimethylaminobenzyl | H, OH, acetoxy | K |
| Benzohydryl | H, acetoxy | Na |
| Trityl | Acetoxy | Na |
| 2-furylmethyl | H, OH | Na |

EXAMPLE X

To a solution of the mono 5-indanyl ester of phenylmalonic acid (0.05 mole) in tetrahydrofuran (100 ml.) is added hexachlorocyclotriphosphatriazine (0.05 mole) in tetrahydrofuran (50 ml.) and triethylamine (0.05 mole). The mixture is stirred at room temperature for fifteen minutes then treated with a fermentation broth (one liter prepared according to Example IV of U.S. Pat. No. 3,116,218) and containing 6-aminopenicillanic acid (0.052 mole). The reaction mixture is stirred for one-half hour then cooled to 0°–5° C., adjusted to pH 2.0 with 6 N hydrochloric acid and worked up according to the procedure of Example I to provide α-(carbo-5-indanyloxy)benzylpenicillin sodium salt.

PREPARATION A

Malonic acids

The following arylmalonic acids not previously described in the literature are prepared by the method of Wallingford et al., J. Am. Chem. 63, 2056–2059 (1964), which comprises condensing an alkyl carbonate, usually diethyl carbonate, with an equimolar proportion of the desired ethyl aryl acetate in the presence of an excess (4–8 times) of sodium ethylate with continuous removal of by-product alcohol from the reaction mixture. The esters thus produced are hydrolyzed to the acid by known methods.

$$R_1-CH\begin{matrix}COOH\\COOH\end{matrix}$$

R₁

| | |
|---|---|
| o-methoxyphenyl | 3-pyridyl |
| m-methoxyphenyl | 4-pyridyl |
| p-methoxyphenyl | o-butoxyphenyl |
| o-trifluoromethylphenyl* | o-dimethylaminophenyl |
| m-trifluoromethylphenyl | o-diethylaminophenyl |
| p-trifluoromethylphenyl | m-dimethylaminophenyl |
| o-isopropylphenyl | p-dimethylaminophenyl |
| 3-furyl | |

*The necessary o-trifluoromethylphenylacetic acid is prepared from o-trifluoromethylbenzonitrile by the precedure of Corse et al., J. Am. Chem. Soc. 70, 2841 (1948) which comprises: (a) conversion of the nitrile to o-trifluoromethylacetophenone by a Grignard reaction with methylmagnesium iodide followed by hydrolysis; (b) reaction of the acetophenone with sulfur and morpholine at 135° C. for 16 hours followed by treatment with glacial acetic acid and hydrochloric acid.

PREPARATION B

Aminoisopropanols

The following aminoisopropanols are prepared by the reaction of propylene oxide with the appropriate amine. The procedure in general comprises reacting the propylene oxide with an aqueous solution of the amine in a 1.0 to 1.4 molar ratio in a sealed tube. The sealed tube is shaken and allowed to stand overnight, then heated to 80° C. for six hours, then at 95° C. for four hours. The tube is then cooled, the contents removed and the aminoisopropanol salted out with potassium carbonate.

The product, if liquid, is separated, dried with solid potassium hydroxide then distilled under reduced pressure. The product, if solid, is filtered off and recrystallized from a suitable solvent.

NR₅R₆

| | |
|---|---|
| dimethylamino | piperidino |
| diethylamino | pyrrolidino |
| di-n-propylamino | pyrrolo |
| diisopropylamino | morpholino |
| di-n-butylamino | thiomorpholino |
| 1,4,5,6-tetrahydropyrimidino | imidazolino |
| N-ethylpiperazino | imidazolidino |

PREPARATION C

2-aminopropanols

The following 2-aminopropanols having the formula $$HO-CH_2-CH(CH_3)-NR_5R_6$$

represents a di(lower alkyl)amino or a heterocyclic group are prepared by the procedure of Moffett, Org. Syn., Coll. vol. IV, p. 834 which comprises lithium aluminum hydride reduction of the appropriate precursor ester of the formula $$H_5C_2OOC-CH(CH_3)-NR_5R_6$$

said esters being prepared as described by Moffett, Org. Syn., Coll. vol. IV, p. 466 by reaction of the desired amine with ethyl α-bromopropionate.

—NR₅R₆

| | |
|---|---|
| di(n-propyl)amino | piperidino |
| di(n-butyl)amino | morpholino |
| diisopropylamino | thiomorpholino |
| 1,4,5,6-tetrahydropyrimidino | pyrrolo |
| N-methylpiperazino | imidazolino |
| N-n-butylpiperazino | imidazolidino |

What is claimed is:

1. In the process for the acylation of an amino acid compound selected from the group consisting of those having the formulae:

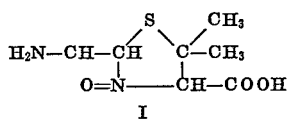

I and

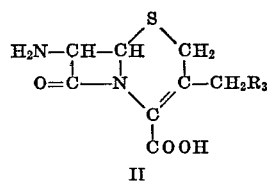

II and the pharmaceutically acceptable salts thereof wherein R₃ is selected from the group consisting of hydrogen, hydroxy, and acetoxy, with an arylmalonic acid half-ester having the formula:

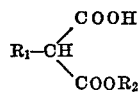

wherein R₁ is selected from the group consisting of thienyl, furyl, pyridyl, phenyl, and substituted phenyl wherein the substituent is selected from the group consisting of (lower) alkyl, chloro, bromo, (lower)alkoxy, di(lower)alkylamino and trifluoromethyl; and R₂ is selected from the group consisting of phenyl and
substituted phenyl wherein the substituent is selected from the group consisting of at least one of chloro, bromo, fluoro, lower alkyl, lower alkoxy, lower alkanoyl, carbo(lower)alkoxy, nitro, and di(lower) alkyl amino;
furyl
quinolyl
methyl substituted quinolyl
phenazinyl
9,10-anthraquinonyl
phenanthrenequinonyl
anthracenyl
phenanthryl
(1,3-benzodioxlyl)
3-(2-methyl-4-pyronyl)
3,(4-pyronyl) and
N-(methylpyridyl);

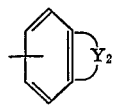

wherein Y₂ is selected from the group consisting of:
—CH=CH—O—
—CH=CH—S—
—CH₂—CH₂—S—
—CH=N—CH=CH—
—CH=CH—CH=CH—
—C(O)—CH=CH—C(O)— and
—C(O)—C(O)—CH=CH—;

and

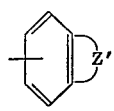

wherein Z' is lower alkylene and is selected from the group consisting of —(CH₂)₃— and —(CH₂)₄—, and substituted derivatives thereof wherein the substituent is selected from the group consisting of methyl, chloro and bromo;

benzyl and
substituted benzyl wherein the substituent is selected from the group consisting of chloro, bromo, fluoro, lower alkyl, lower alkoxy, lower alkanoyl, carbo(lower)alkoxy, nitro, and di(lower)alkylamino;
phthalimidomethyl
benzohydryl
trityl
cholesteryl
alkenyl having up to 8 carbon atoms
alkynyl having up to 8 carbon atoms
(1-indanyl)methyl
(2-indanyl)methyl
furylmethyl
pyridylmethyl
(2-pyrrolidono)methyl
(4-imidazolyl)methyl
[2,2-di(lower alkyl)-1,3-dioxolon-4-yl]methyl
cycloalkyl and (lower alkyl)substituted cycloalkyl having from 3 to 7 carbon atoms in the cycloalkyl moiety;
bicyclo [4·4·0]decyl
thujyl
fenchyl
isofenchyl
7-adamantanyl
ac-indanyl and substituted derivatives thereof wherein the substituent is selected from the group consisting of methyl, chloro and bromo;
ac-tetrahydronaphthyl and substituted derivatives thereof wherein the substituent is selected from the group consisting of methyl, chloro and bromo;
alkyl and substituted lower alkyl wherein the substituent is selected from the group consisting of at least one of:
chloro
bromo
fluoro
nitro
carbo(lower alkoxy)
lower alkanoyl
lower alkoxy and
cyano;
—CH₂—CH₂—NR₅R₆
—CH₂—CH₂—CH₂—NR₅R₆
—CH₂—CH(CH₃)—NR₅R₆ and
—CH(CH₃)—CH₂—NR₅R₆ wherein —$NR_5R_6$ is selected from the group consisting of —NH(lower alkanoyl)

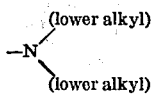

wherein the (lower alkyl) groups may be alike or different; and —N(lower alkyl)anilino;
and —(lower alkylene)—$Y_1$ wherein (lower alkylene) contains from 1 to 3 carbon atoms;
and $Y_1$ is selected from the group consisting of:
azetidino
aziridino
pyrrolidino
piperidino
morpholino
thiomorpholino
N-(lower alkyl)piperazino
pyrrolo
imidazolo
2-imidazolino
2,5-dimethylpyrrolidino
1,4,5,6-tetrahydropyrimidino
4-methylpiperidino and
2,6-dimethylpiperidino;

the improvement which comprises (a) reacting at a temperature of from about —10° to about 50° C. in a reaction-inert solvent, said arylmalonic acid half-ester with a hexahalocyclotriphosphatriazine selected from the group consisting of hexachlorocyclotriphosphatriazine and hexabromocyclotriphosphatriazine, and (b) thereafter reacting the product thus produced with said amino acid compound at a temperature of from about —10° to about 50° C. in a reaction-inert solvent.

2. The process of claim 1 wherein the reaction-inert solvent is selected from the group consisting of methylene chloride, dioxane, tetrahydrofuran, diethyl ether, acetone, ethyl acetate, and methyl isobutyl ketone.

3. The process of claim 2 wherein the molar proportion of arylmalonic acid half-ester:hexahalocyclotriphosphatriazine:amino acid compound is from about 1:1:1 to about 1:3:10.

4. The process of claim 3 wherein the amino acid compound is of Formula I and $R_1$ of the arylmalonic acid half-ester $R_1$

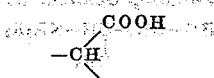

is phenyl.

5. The process of claim 3 wherein the amino acid compound is of Formula II wherein $R_3$ is acetoxy and $R_1$ of the arylmalonic acid half-ester

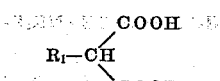

is phenyl.

6. The process of claim 3 wherein the amino acid compound is of Formula II wherein $R_3$ is hydrogen and $R_1$ of the arylmalonic acid half-ester

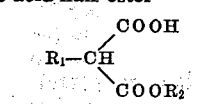

is phenyl.

7. The process of claim 4 wherein $R_2$ is 5-indanyl.
8. The process of claim 4 wherein $R_2$ is phenyl.
9. The process of claim 4 wherein $R_2$ is 2-isopropylphenyl.
10. The process of claim 5 wherein $R_2$ is 5-indanyl.
11. The process of claim 5 wherein $R_2$ is 4-chloro-2-methylphenyl.
12. The process of claim 5 wherein $R_2$ is 2-di(n-propyl)aminoethyl.
13. The process of claim 5 wherein $R_2$ is phenyl.
14. The process of claim 6 wherein $R_2$ is phenyl.

References Cited
UNITED STATES PATENTS
3,174,964   3/1965   Hobbs et al. _____ 260—239.1

NICHOLAS S. RIZZO, Primary Examiner

U.S. Cl. X.R.
260—243 C; 424—271

UNITED STATES PATENT OFFICE
CERTIFICATE OF CORRECTION

Patent No. 3,651,050      Dated March 21, 1972

Inventor(s) Susumu Nakanishi

It is certified that error appears in the above-identified patent and that said Letters Patent are hereby corrected as shown below:

Column 1, line 36, change "664,654" to -- 664,645 --.

Column 9, that portion of the formula reading

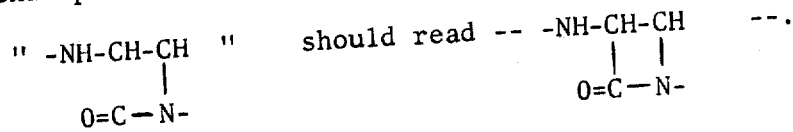

Column 21, line 8, delete "represents a di(lower alkyl)amino or a heterocyclic group".

Column 21, lines 31-34, formula I should read

" 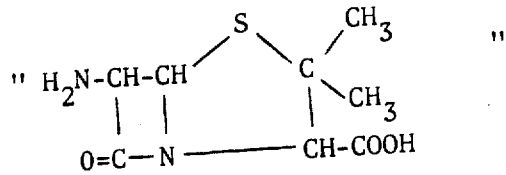 "

Column 24, line 3, delete "$R_1$"

lines 4-6, the formula should read -- $R_1\text{-CH}\begin{smallmatrix}\diagup\text{COOH}\\\diagdown\text{COOR}_2\end{smallmatrix}$ Signed and sealed this 2nd day of April 1974.

(SEAL)
Attest:

EDWARD M. FLETCHER, JR.
Attesting Officer

C. MARSHALL DANN
Commissioner of Paten